US006967942B2

(12) United States Patent
Smolinske et al.

(10) Patent No.: US 6,967,942 B2
(45) Date of Patent: Nov. 22, 2005

(54) COMMUNICATION INFRASTRUCTURE AND METHOD TO SPEED UPLINK DATA SETUP

(75) Inventors: Jeffrey C. Smolinske, Schaumburg, IL (US); Jyoti N. Black, St. Charles, IL (US); Gary E. Western, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 933 days.

(21) Appl. No.: 09/891,548

(22) Filed: Jun. 26, 2001

(65) Prior Publication Data

US 2002/0196750 A1 Dec. 26, 2002

(51) Int. Cl.[7] ................................................ H04J 3/16
(52) U.S. Cl. ...................... 370/346; 370/443; 370/455; 370/462; 455/450; 455/509
(58) Field of Search ........................ 370/337, 345–347, 370/442–444, 455, 462; 455/450, 452.1, 455/509, 512

(56) References Cited

U.S. PATENT DOCUMENTS

| 6,671,511 | B1 * | 12/2003 | Forssell et al. | .......... 455/452.1 |
| 6,718,179 | B1 * | 4/2004 | Forssell et al. | ............. 455/509 |
| 2002/0105940 | A1 * | 8/2002 | Forssell et al. | |
| 2004/0047292 | A1 * | 3/2004 | duCrest et al. | |

FOREIGN PATENT DOCUMENTS

| WO | WO 99 48310 A | 9/1999 |
| WO | WO 01 47314 A | 6/2001 |

OTHER PUBLICATIONS

"Digital Cellular Telecommunications System (Phase 2+) General Packet Radio Service (GPRS); Overall description of the GPRS Radio Interface; Stage 2 (3GPP TS 03.64 version 8.8.0 Release 1999)" ETSI TS 101 350 V8.8.0; Apr. 2001, pp. 1-58.

"Digital Cellular Telecommunications System (Phase 2+) General Packet Radio Service (GPRS); Serviec description; Stage 2; 3GPP TS 03.60 version 6.8.0 Release 1997" ETSI TS 101 344 V6.8.0; Mar. 2001, pp. 0, 22, 76-77.

"Extensions to Round-CDMA: Reservation Oversampling, Service Round Monitoring and Adaptive Reservation Threshold" IBM Technical Disclosure Bulletin, IBM Corp. New York, US. vol. 34, No. 6, Nov. 1991, pp. 456-458.

Thanasorravit, A. et al. "Perfomance of Dynamic Frame Reservation Multiple Access-Dynamic Permission (DFRMA-DP) Protocol for Integrated Voice and Data Service in a Wireless Communication Systems." IEEE Vehicular Technology Conference, 2001, pp. 2113-2117.

* cited by examiner

Primary Examiner—Dang Ton
Assistant Examiner—Inder Pal Mehra
(74) Attorney, Agent, or Firm—Jeffrey K. Jacobs

(57) ABSTRACT

To address the need for a communication infrastructure and method to speed uplink data setup, the present invention provides for the assignment of uplink packet data resources by basestation transceiver systems (BTSs) without the need to communicate with any packet control unit (PCUs) first. The present invention accomplishes this by reserving packet data resources before they are needed or requested and providing them to BTSs for assignment. Thus, BTS-PCU communication occurs in the period before an uplink connection is needed and after uplink data is established, effectively eliminating the BTS-PCU delay from uplink data setup. Moreover, the present invention provides for the transmission of transmit allowance messages before an uplink request is made by the communication unit, further reducing uplink data setup time.

19 Claims, 2 Drawing Sheets

COMMUNICATION INFRASTRUCTURE AND METHOD TO SPEED UPLINK DATA SETUP

FIELD OF THE INVENTION

The present invention relates generally to the field of wireless communication and, in particular, to reducing the time required to setup uplink data connections.

BACKGROUND OF THE INVENTION

In today's General Packet Radio Systems (GPRS) a packet control unit (PCU) manages, allocates, and schedules the use of packet data resources necessary to establish uplink packet data connections between mobile units and the infrastructure. To reduce the cost of deploying these systems, PCUs are remotely located from the basestation transceiver systems (BTSs) that maintain the wireless links between the mobile units and the infrastructure. When a mobile unit requests an uplink data connection the BTS maintaining the wireless link with the mobile must communicate with the remote PCU to setup the requested link. Thus, the link setup is delayed by the messaging between the BTS and the PCU. Because of uplink messaging required by the internet protocol (IP), this BTS-PCU delay may be experienced multiple times while a web page is downloaded to the mobile. Therefore, to speed overall data transfer a need exists for a communication infrastructure and method to speed uplink data setup.

DESCRIPTION OF A PREFERRED EMBODIMENT

To address the need for a communication infrastructure and method to speed uplink data setup, the present invention provides for the assignment of uplink packet data resources by BTSs without the need to communicate with any PCUs first. The present invention accomplishes this by reserving packet data resources before they are needed or requested and providing them to BTSs for assignment. Thus, BTS-PCU communication occurs in the period before an uplink connection is needed and after uplink data is established, effectively eliminating the BTS-PCU delay from uplink data setup. Moreover, the present invention provides for the transmission of transmit allowance messages before an uplink request is made by the communication unit, further reducing uplink data setup time.

Figure 1:
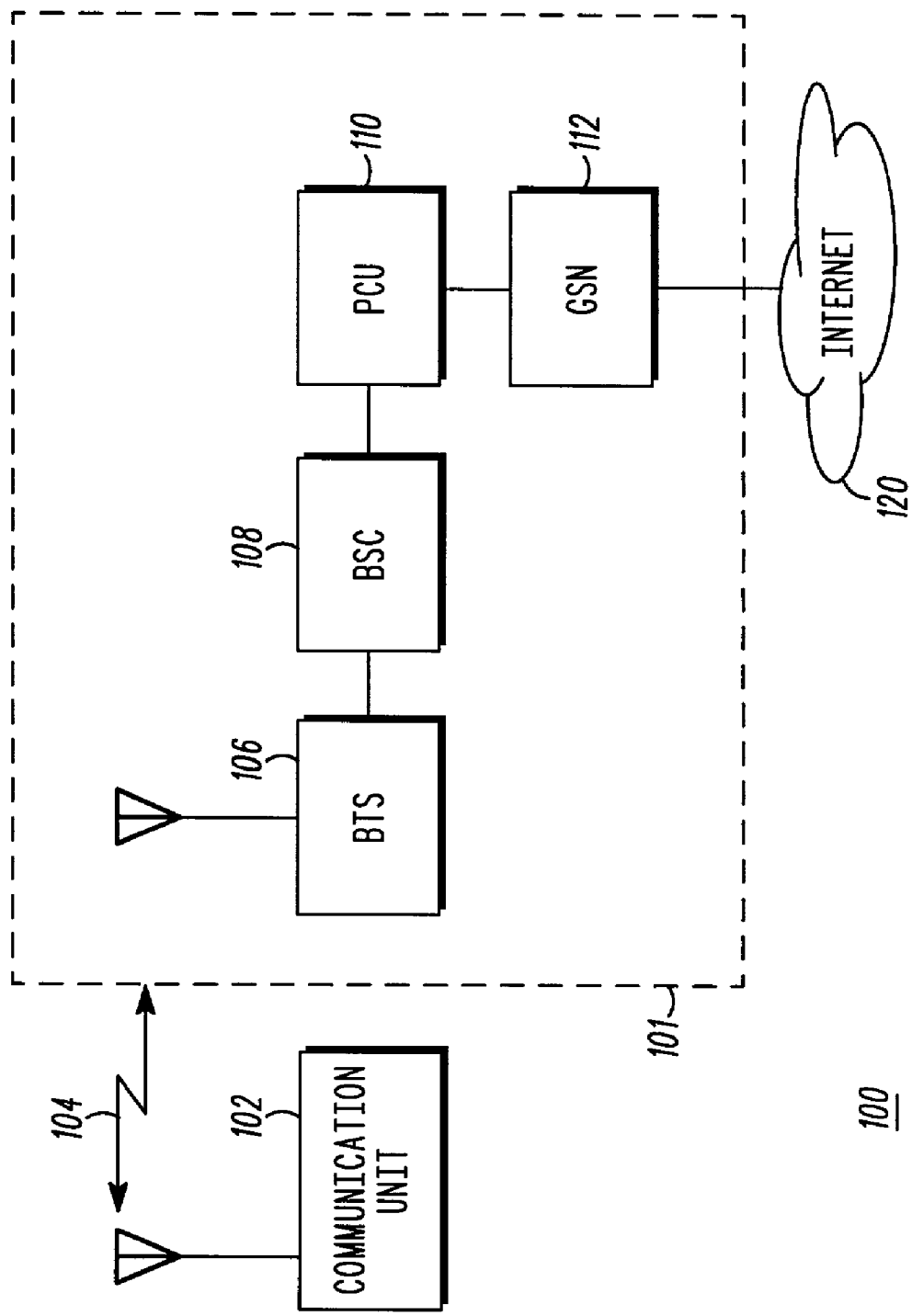
FIG. 1 is a logical, block diagram depiction of a communication system in accordance with a preferred embodiment of the present invention.
Figure 2:
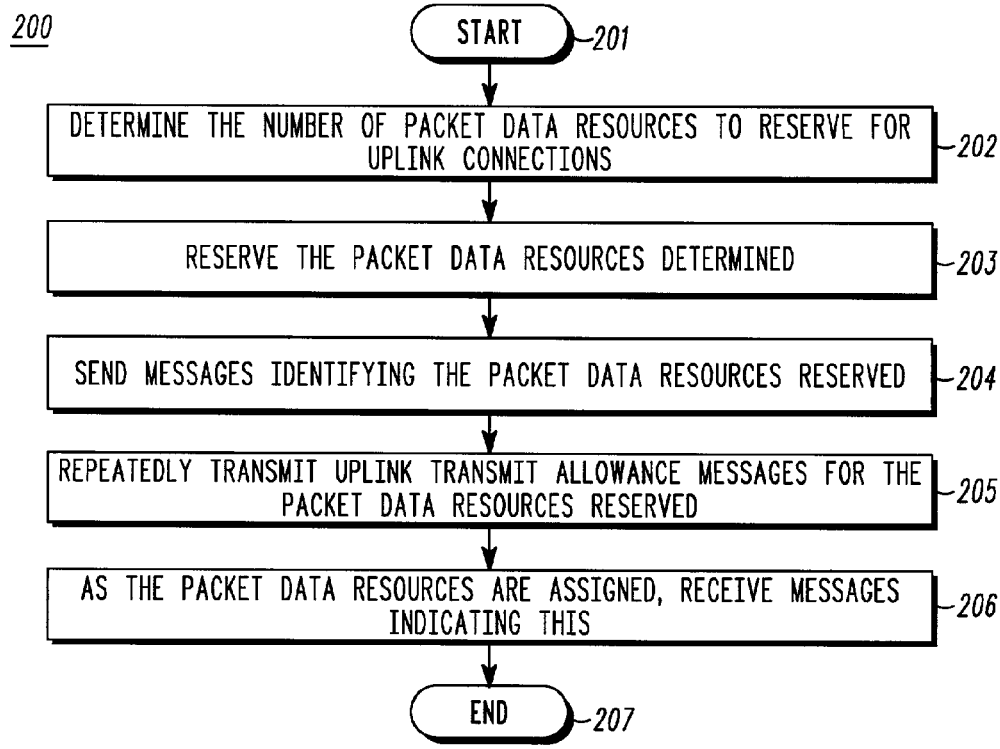
FIG. 2 is a logic flow diagram of steps executed by a PCU in accordance with a preferred embodiment of the present invention.
Figure 3:
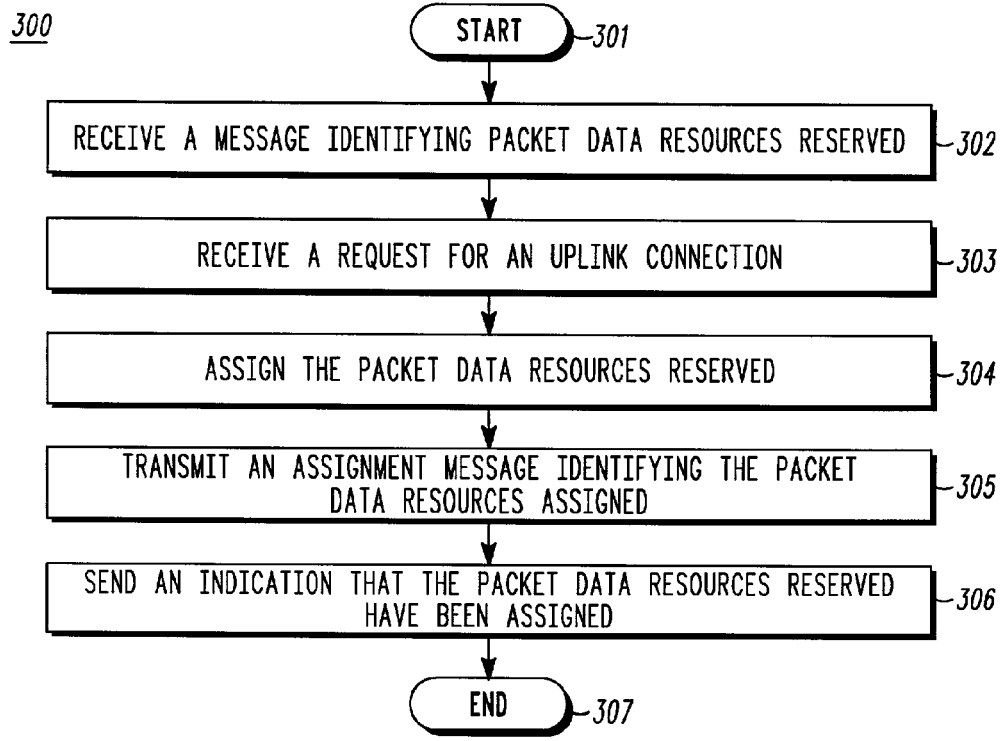
FIG. 3 is a logic flow diagram of steps executed by a BTS in accordance with a preferred embodiment of the present invention.

The present invention can be more fully understood with reference to FIGS. 1–3. FIG. 1 is a logical, block diagram depiction of a communication system in accordance with the preferred embodiment of the present invention. Preferably, communication system 100 is a system in accordance with the well-known European Telecommunications Standards Institute—3$^{rd}$ Generation Partnership Project—Digital Cellular Telecommunications System—General Packet Radio Service standard (herein referred to as "GPRS").

System 100 comprises communication infrastructure 101, communication unit 102, and the Internet (or private intranet) 120. Communication infrastructure 101 comprises BTS 106, base site controller (BSC) 108, PCU 110, and GPRS support node (GSN) 112. BTSs, BSCs, PCUs, and GSNs are well known in the field of wireless communications and are described in the GPRS standard. Thus, BTS 106 and PCU 110 are well known GPRS devices modified using well-known software techniques to perform the present invention. Communication unit 102 preferably comprises a wireless mobile unit that communicates with infrastructure 101, specifically BTS 106, via wireless communication resource 104 in accordance with the GPRS standard. In general, GPRS communication units vary with respect to the time slots each can use while communicating with the infrastructure. Communication unit 102, also therefore, has a so-called timeslot configuration that determines which time slots it can use.

Operation of a preferred communication system, in accordance with the present invention, occurs substantially as follows. In its most fundamental embodiment, PCU 110 of the present invention reserves packet data resources needed for an uplink connection from communication unit 102 to communication infrastructure 101. PCU 110 reserves the resources before communication unit 102 needs or requests the uplink connection, and sends to BTS 106 a message identifying the packet data resources reserved. Preferably, the resources reserved include a subchannel of an available packet data channel, a timing advance index (i.e., a GPRS TAI), and a temporary flow identifier (i.e., a GPRS TFI). PCU 110 also transmits via BTS 106 an uplink transmit allowance message (i.e., a GPRS uplink state flag or USF) for the packet data subchannel. The uplink transmit allowance message is needed by communication unit 102 to transmit on the uplink subchannel (i.e., after being assigned to the subchannel).

BTS 106 receives from communication unit 102 via wireless communication resource 104 a request for an uplink connection (i.e., a GPRS random access channel request). BTS 106, having earlier received a message identifying the packet data resources reserved, assigns the reserved resources to communication unit 102 and preferably sends communication unit 102 a GPRS Immediate Assignment message identifying the packet data resources assigned. In the preferred embodiment, BTS 106 then sends PCU 110 an indication that the packet data resources reserved have been assigned.

To simplify the description above, PCU 110 was described as reserving packet data resources needed for a single uplink connection. Preferably, however, PCU 110 determines the number of packet data resources to reserve (i.e., the number of uplink connections to reserve resources for) based on a rate of indications that packet data resources reserved have been used to establish uplink connections. In other words, the rate of uplink establishment is used as an indicator of demand for uplinks. The greater the calculated demand, the more resources are reserved in anticipation. Preferably, each set of resources for an uplink is handled as the single set of resources was handled in the description above. In addition, packet data resources usable by the greatest number of communication units are reserved first. The various time slot configurations of the communication units supported by the system determine which resources will be usable by the greatest number of communication units.

Regarding the transmission of the uplink transmit allowance messages, preferably, PCU 110 repeatedly transmits allowance messages. For packet data resources on packet data channels that continuously transmit (e.g., on broadcast carriers or BCHs), PCU 110 repeatedly transmits allowance messages for each set of resources reserved based on the relative order of reservation of each of the corresponding sets of resources. (For packet data resources on packet data channels that do not continuously transmit, PCU 110 may not transmit the corresponding allowance messages until PCU 110 receives an indication from BTS that the packet data resources reserved have been assigned.) The relative order of reservation determines the frequency of each repeated transmission of the allowance message for that set of reserved resources. For example, the uplink transmit allowance message for the first set of resources reserved will be transmitted most frequently, while messages for subsequent sets transmitted less and less frequently, if at all. Because communication units must receive the transmit allowance message for their assigned subchannel before transmitting data, the allowance messages are preferably transmitted repeatedly and with a frequency related to the likelihood that a communication unit has already received an assignment for the corresponding subchannel and is waiting to transmit data. The preferred embodiment thus seeks to minimize the uplink data setup delay.

FIG. 2 is a logic flow diagram 200 of steps executed by a PCU in accordance with a preferred embodiment of the present invention. The logic flow begins (201) with the PCU determining (202) the number of packet data resources to reserve for uplink connections. As discussed above, an estimation of demand for uplinks and the particular communication unit timeslot configurations supported are used for this determination. The PCU then reserves (203) packet data resources needed for the number of uplink connections determined and sends (204) messages identifying the packet data resources reserved to a BTS.

In step 205, the PCU repeatedly transmits, in the manner discussed above, uplink transmit allowance messages for the uplinks for which resources are reserved. In the preferred embodiment, as reserved resources are assigned by the BTS, the PCU receives (206) an indication that the particular resources reserved are assigned to establish uplink connections, and the logic flow ends (207). Preferably, this indication may either be a message from the BTS indicating that the BTS assigned the packet data resources to the communication unit or data received from a communication unit via the uplink connection itself. Also, this indication of reserved resources being assigned preferably triggers a new determination as in step 202. If communication unit demand for uplink connections is above a threshold, the PCU again reserves resources for uplink connections repeating the logic flow of diagram 200.

FIG. 3 is a logic flow diagram 300 of steps executed by a BTS in accordance with a preferred embodiment of the present invention. The logic flow begins (301) with the BTS receiving (302) a message identifying packet data resources reserved by the PCU. The BTS also receives (303) a request for an uplink connection from a communication unit. In the interim between steps 302 and 303, the BTS may receive multiple messages identifying packet data resources reserved by the PCU. Upon receiving a request for an uplink connection, the BTS assigns (304) a set of reserved resources to the requesting communication unit for the establishment of an uplink and transmits (305) an assignment message identifying the packet data resources assigned to the communication unit. Preferably, the BTS assigns resources for uplinks in the same order it receives them from the PCU, unless the PCU sends the BTS a cancel message, canceling the reservation of particular packet data resources. After assigning resources, the BTS preferably sends (306) the PCU an indication of which packet data resources have been assigned, and the logic flow ends (307).

The present invention thus speeds overall data transfer by reducing the time required to setup uplink data connections. PCUs and BTSs no longer must exchange messages between the communication unit request for an uplink and the assignment of an uplink. Furthermore, the present invention provides for the transmission of transmit allowance messages before an uplink request is made by the communication unit. This reduces the time the unit must wait for the transmit allowance once assigned an uplink. Together, these aspects of the present invention significantly speed uplink data setup.

While the present invention has been particularly shown and described with reference to particular embodiments thereof, it will be understood by those skilled in the art that various changes in form and details may be made therein without departing from the spirit and scope of the present invention.

What is claimed is:

1. A method for a communication infrastructure to speed uplink data setup, the method comprising the steps of:
   reserving, by a packet control unit (PCU) in the communication infrastructure, packet data resources needed for an uplink connection from a communication unit of a plurality of communication units to the communication infrastructure that has not yet been requested by the communication unit and is not yet needed by the communication unit, wherein the packet data resources comprise at least a portion of a packet data channel;
   sending, by the PCU to a basestation transceiver system (BTS), a message identifying the packet data resources reserved;
   transmitting, by the PCU via the BTS, an uplink transmit allowance message for the at least a portion of the packet data channel; and
   receiving, by the PCU, an indication that the packet data resources reserved have been used to establish the uplink connection, wherein the packet data resources comprise at least one timeslot of a packet data channel, a timing advance index, and a temporary flow identifier.

2. The method of claim 1 wherein the step of receiving the indication comprises receiving a message from the BTS indicating at the BTS assigned the packet data resources to the communication unit.

3. The method of claim 1 wherein the step of receiving the indication comprises receiving data from the communication unit via the uplink connection.

4. The method of claim 1 further comprising the step of sending, by the PCU to the BTS, a message canceling a reservation of the packet data resources reserved.

5. The method of claim 1 further the step of after the indication is received, reserving packet data resources needed for a second uplink connection from a second communication unit of the plurality of communication units to the communication infrastructure that has not yet been requested by the second communication unit and is not yet needed by the second communication unit.

6. The method of claim 1 further comprising the step of after the indication is received and if communication unit demand for uplink connections is above a threshold, reserving packet data resources needed for a second uplink connection from a second communication unit of the plurality of communication units to the communication infrastructure that has not yet been requested by the second communication unit and is not yet needed by the second communication unit.

7. The method of claim 1 further comprising the step of repeatedly transmitting, by the PCU via the BTS, the uplink transmit allowance message for the at least a portion of the packet data channel.

8. The method of claim 1 further comprising the step of reserving at least one additional packet data resource needed for additional uplink connections from additional communication units of the plurality of communication units to the communication infrastructure that have not yet been requested by the additional communication units and are not yet needed by the additional communication units.

9. The method of claim 8 further comprising the step of determining a number of additional packet data resources to reserve based on a rate of indications that packet data resources reserved have been used to establish uplink connections.

10. The method of claim 8 further comprising the step of repeatedly transmitting, by the PCU via the BTS, uplink transmit allowance messages for at least some of the at least one additional packet data resource reserved, wherein a relative frequency of transmission of each uplink transmit allowance message is based on a relative order of reservation of each corresponding packet data resource.

11. The method of claim 1 wherein the step of reserving comprises the step of reserving, by the PCU, packet data resources usable by the greatest number of communication units of the plurality of communication units.

12. A method for a communication infrastructure to speed data uplink setup, the method comprising the steps of:
   receiving, by a BTS from a PCU, a message identifying packet data resources reserved, wherein the packet data resources reserved comprise at least a portion of a packet data channel needed for an uplink connection from a communication unit to the communication infrastructure that has not yet been requested by the communication unit and is not yet needed by the communication unit;
   receiving, by the BTS from the communication unit, a request for an uplink connection;
   assigning, by the BTS to the communication unit, the packet data resources reserved; and
   transmitting, by the BTS to the communication unit; an assignment message identifying the packet data resources assigned to the communication unit, wherein the packet data resources comprise at least one timeslot of a packet data channel, a timing advance index, and a temporary flow identifier.

13. The method of claim 12 further comprising the step of sending, by the BTS to the PCU, an indication that the packet data reserved have been assigned.

14. A communication infrastructure comprising:
   a packet control unit (PCU) for reserving packet data resources needed for an uplink connection from a communication unit to the communication infrastructure that has not yet been requested by the communication unit and is not yet needed by the communication unit, wherein the packet data resources comprise at least a portion of a packet data channel, for sending to a basestation transceiver system (BTS) a message identifying the packet data resources reserved, for transmitting via the BTS an uplink transmit allowance message for the at least a portion of the packet data channel, and for receiving an indication that the packet data resources reserved have been used to establish the uplink connection, wherein the packet data resources comprise at least one timeslot of a packet data channel, a timing advance index, and a temporary flow identifier.

15. The communication infrastructure of claim 14 wherein the PCU is further for reserving at least one additional packet data resource needed for additional uplink connections from additional communication units to the communication infrastructure that have not yet been requested by the additional communication units and are not yet needed by the additional communication units.

16. The communication infrastructure of claim 15 wherein the PCU is further for determining the number of additional packet data resources to reserve based on a rate of indications that packet data resources reserved have been used to establish uplink connections.

17. The communication infrastructure of claim 14 wherein the PCU is further for repeatedly transmitting via the BTS uplink transmit allowance messages for at least some of the at least one additional packet data resource reserved, wherein a relative frequency of transmission of each uplink transmit allowance message is based on a relative order of each corresponding packet data resource.

18. A communication infrastructure comprising:
   a basestation transceiver system (BTS) for receiving from a PCU a message identifying packet data resources reserved, wherein the packet data resources reserved comprise at least a portion of a packet data channel needed for an uplink connection from a communication unit to the communication infrastructure that has not yet been requested by the communication unit and is not yet needed by the communication unit, for receiving from the communication unit a request for an uplink connection, for assigning to the communication unit the packet, data resources reserved, and for transmitting to the communication unit an assignment message identifying the packet data resources being assigned to the communication unit, wherein the packet data resources comprise at least one timeslot of a packet data channel, a timing advance index, and a temporary flow identifier.

19. The communication infrastructure of claim 18 wherein the BTS is further for sending to the PCU an indication that the packet data resources reserved have been assigned.

* * * * *